(12) United States Patent
Ferucci et al.

(10) Patent No.: US 9,569,724 B2
(45) Date of Patent: *Feb. 14, 2017

(54) USING ONTOLOGICAL INFORMATION IN OPEN DOMAIN TYPE COERCION

(75) Inventors: David A. Ferucci, Yorktown Heights, NY (US); Aditya A. Kalyanpur, Westwood, NJ (US); James W. Murdock, IV, Millwood, NY (US); Christopher A. Welty, Hawthorne, NY (US); Wlodek W. Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/244,348

(22) Filed: Sep. 24, 2011

(65) Prior Publication Data

US 2012/0078873 A1    Mar. 29, 2012

Related U.S. Application Data

(60) Provisional application No. 61/386,019, filed on Sep. 24, 2010.

(51) Int. Cl.
*G06F 7/00* (2006.01)
*G06N 5/02* (2006.01)

(52) U.S. Cl.
CPC ...................... *G06N 5/02* (2013.01)

(58) Field of Classification Search
None
See application file for complete search history.

(56) References Cited

U.S. PATENT DOCUMENTS

| | | |
|---|---|---|
| 3,559,995 A | 2/1971 | Steadman |
| 4,594,686 A | 6/1986 | Yoshida |
| 4,599,691 A | 7/1986 | Sakaki et al. |
| 4,829,423 A | 5/1989 | Tennant et al. |
| 4,921,427 A | 5/1990 | Dunn |
| 5,374,894 A | 12/1994 | Fong |

(Continued)

OTHER PUBLICATIONS

Chu-Carroll et al., "In Question-Ansering, Two Heads are Better than One", HLT-NAACL'03, May-Jun. 2003, pp. 24-31, Edmonton, Canada.

(Continued)

*Primary Examiner* — Thu Nga Nguyen
(74) *Attorney, Agent, or Firm* — Scully, Scott, Murphy & Presser, P.C.

(57) ABSTRACT

A computer-implemented system, method and program product generates answers to questions in an input query text string. The method includes determining, by a programmed processor unit, a lexical answer type (LAT) string associated with an input query; automatically obtaining a candidate answer string to the input query from a data corpus; mapping the query LAT string to a first type string in a structured resource; mapping the candidate answer string to a second type string in the structured resource; and determining if the first type string and the second type string are disjointed; and scoring the candidate answer string based on the determination of the types being disjointed wherein the structured resource includes a semantic database providing ontological content.

26 Claims, 10 Drawing Sheets

(56) References Cited

U.S. PATENT DOCUMENTS

| | | |
|---|---|---|
| 5,414,797 A | 5/1995 | Vassiliadis et al. |
| 5,513,116 A | 4/1996 | Buckley et al. |
| 5,546,316 A | 8/1996 | Buckley et al. |
| 5,550,746 A | 8/1996 | Jacobs |
| 5,559,714 A | 9/1996 | Banks et al. |
| 5,634,051 A | 5/1997 | Thomson |
| 5,794,050 A | 8/1998 | Dahlgren et al. |
| 6,487,545 B1 | 11/2002 | Wical |
| 6,763,341 B2 | 7/2004 | Okude |
| 6,829,603 B1 | 12/2004 | Chai et al. |
| 6,947,885 B2 | 9/2005 | Bangalore et al. |
| 6,983,252 B2 | 1/2006 | Matheson et al. |
| 7,092,928 B1 | 8/2006 | Elad et al. |
| 7,136,909 B2 | 11/2006 | Balasuriya |
| 7,139,752 B2 | 11/2006 | Broder et al. |
| 7,181,438 B1 | 2/2007 | Szabo |
| 7,216,073 B2 | 5/2007 | Lavi et al. |
| 7,558,778 B2 | 7/2009 | Carus et al. |
| 7,590,606 B1 | 9/2009 | Keller et al. |
| 7,730,085 B2 | 6/2010 | Hassan et al. |
| 7,805,303 B2 | 9/2010 | Sugihara et al. |
| 2001/0032211 A1 | 10/2001 | Kuzumaki |
| 2003/0033287 A1 | 2/2003 | Shanahan et al. |
| 2004/0049499 A1 | 3/2004 | Nomoto et al. |
| 2004/0064305 A1 | 4/2004 | Sakai |
| 2004/0122660 A1 | 6/2004 | Cheng et al. |
| 2004/0254917 A1 | 12/2004 | Brill et al. |
| 2005/0033711 A1 | 2/2005 | Horvitz et al. |
| 2005/0060301 A1 | 3/2005 | Seki et al. |
| 2005/0086045 A1 | 4/2005 | Murata |
| 2005/0086222 A1 | 4/2005 | Wang et al. |
| 2005/0114327 A1 | 5/2005 | Kumamoto et al. |
| 2005/0143999 A1 | 6/2005 | Ichimura |
| 2005/0256700 A1 | 11/2005 | Moldovan et al. |
| 2005/0289168 A1 | 12/2005 | Green et al. |
| 2006/0053000 A1 | 3/2006 | Moldovan et al. |
| 2006/0106788 A1 | 5/2006 | Forrest |
| 2006/0122834 A1 | 6/2006 | Bennett |
| 2006/0141438 A1 | 6/2006 | Chang et al. |
| 2006/0173834 A1 | 8/2006 | Brill et al. |
| 2006/0204945 A1 | 9/2006 | Masuichi et al. |
| 2006/0206472 A1 | 9/2006 | Masuichi et al. |
| 2006/0206481 A1 | 9/2006 | Ohkuma et al. |
| 2006/0235689 A1* | 10/2006 | Sugihara et al. ............ 704/257 |
| 2006/0271353 A1* | 11/2006 | Berkan et al. .................... 704/9 |
| 2006/0277165 A1 | 12/2006 | Yoshimura et al. |
| 2006/0282414 A1 | 12/2006 | Sugihara et al. |
| 2006/0294037 A1 | 12/2006 | Horvitz et al. |
| 2007/0022099 A1 | 1/2007 | Yoshimura et al. |
| 2007/0022109 A1 | 1/2007 | Imielinski et al. |
| 2007/0073533 A1 | 3/2007 | Thione et al. |
| 2007/0073683 A1* | 3/2007 | Kobayashi ........ G06F 17/30719 |
| 2007/0078842 A1 | 4/2007 | Zola et al. |
| 2007/0094285 A1 | 4/2007 | Agichtein et al. |
| 2007/0118518 A1 | 5/2007 | Wu et al. |
| 2007/0136246 A1 | 6/2007 | Stenchikova et al. |
| 2007/0196804 A1 | 8/2007 | Yoshimura et al. |
| 2007/0203863 A1 | 8/2007 | Gupta et al. |
| 2008/0071714 A1 | 3/2008 | Menich et al. |
| 2008/0077570 A1 | 3/2008 | Tang et al. |
| 2008/0292687 A1 | 11/2008 | Cheng |
| 2009/0006463 A1 | 1/2009 | Mehra et al. |
| 2009/0024615 A1 | 1/2009 | Pedro et al. |
| 2009/0192966 A1 | 7/2009 | Horvitz et al. |
| 2009/0216731 A1 | 8/2009 | Markovic |
| 2009/0259642 A1 | 10/2009 | Cao et al. |
| 2009/0287678 A1 | 11/2009 | Brown et al. |
| 2009/0292687 A1* | 11/2009 | Fan et al. .......................... 707/5 |
| 2010/0100546 A1 | 4/2010 | Kohler |
| 2010/0223276 A1 | 9/2010 | Al-Shameri et al. |
| 2010/0235362 A1* | 9/2010 | Cormode et al. ............. 707/748 |
| 2011/0066587 A1 | 3/2011 | Ferrucci et al. |

OTHER PUBLICATIONS

Ferrucci et al., "Towards the Open Advancement of Question Answering Systems," IBM Technical Report RC24789, Computer Science, Apr. 22, 2009.

Moldovan et al., "COGEX: A Logic Prover for Question Answering," Proceedings of HLT-NAACL 2003, May-Jun. 2003, pp. 87-93, Edmonton, Canada.

Simmons, "Natural Language Question-Answering Systems: 1969," Communications of the ACM, Jan. 1970, pp. 15-30, 13(1).

Voorhees et al., "Overview of the TREC 2005 Question Answering Track," Proceedings of the Fourteenth Text Retrieval Conference, 2005, Gaithersburg, Maryland.

Weinstein et al., "Agents Swarming in Semantic Spaces to Corroborate Hypotheses," AAMAS'04, Jul. 19-23, 2004, New York, New York, USA, Copyright 2004 ACM 1-58113-864-4/04/007.

Prager et al., "A Multi-Strategy, Multi-Question Approach to Question Answering," In New Directions in Question-Answering, Maybury, M. (Ed.), AAAI Press, 2004.

Strzalkowski et al., "Advances in Open-Domain Question-Answering," Springer, 2006 (background information only—copy of the front cover, copyright page and table of contents only).

Balahur, "Going Beyond Traditional QA Systems: Challenges and Keys in Opinions Question Answering," Coling 2010: Poster Volume, pp. 27-35, Beijing, Aug. 2010.

Blitzer, Domain Adaptation of Natural Language Proccessing Systems, Presented to the Faculties of the University of Pennsylvania in Partial Fulfilment of the Requirements for the Degree of Doctor of Philosophy, 2007.

University of Illinois at Urbana-Champaign, Department of Computer Science, Research, 2010, http://cs.illinois.edu/research?report=UIUCDCS-R-2008-2974.

National Center for Biotechnology Information (NCBI), Entrez the Life Sciences Search Engine, Oct. 28, 2009.

Chang et al., "Creating an Online Dictionary of Abbreviations from MEDLINE," J Am Med Inform Assoc. 2002; 9:612-620. DOI 10.1197/jamia.M1139.

Adar, "SaRAD: a Simple and Robust Abbreviation Dictionary," BIOINFORMATICS, Mar. 2004, pp. 527-533, vol. 20 Issue 4.

Cunningham et al., "The GATE User Guide", http://gate.ac.uk/releases/gate-2.0alpha2-build484/doc/userguide.html, This version of the document is for GATE version 2 alpha 1, of Mar. 2001, pp. 1-13.

"INDRI Language modeling meets inference networks," http://www.lemurproject.org/indri/, last modified May 23, 2011; pp. 1-2.

"Apache UIMA ConceptMapper Annotator Documentation," Written and maintained by the Apache UIMA Development Community, Version 2.3.1, Copyright 2006, 2011 The Apache Software Foundation, pp. 1-7, http://uima.apache.org/sandbox.html#concept.mapper.annotator.

"Question answering," From Wikipedia, the free encyclopedia, http://en.wikipedia.org/wiki/Question_answering, last modified Sep. 8, 2011.

Aditya et al., "Leveraging Community-built Knowledge for Type Coercion in Question Answering," Proceedings of ISWC 2011.

Pasca, "Question-Driven Semantic Filters for Answer Retrieval", International Journal of Pattern Recognition and Artificial Intelligence (IJPRAI), World Scientific Publishing, SI, vol. 17, No. 5, Aug. 1, 2003, pp. 741-756.

Cucerzan et al., "Factoid Question Answering over Unstructured and Structured Web Content", In Proceedings of the 14th Text Retrieval Conference TREC 2005, Dec. 31, 2005.

Molla et al., "AnswerFinder at TREC 2004", Proceedings of the 13th Text Retrieval Conference TREC 2004, Dec. 31, 2004.

Wikipedia, List of poets, Sep. 19, 2011, http://en.wikipedia.org/wiki/List_of_poets.

Delicious, The freshest bookmarks that are flying like hotcakes on Delicious and beyond, Sep. 21, 2011, http://delicious.com/.

Wikipedia, List of poets from the United States, Sep. 19, 2011, http://en.wikipedia.org/wiki/List_of_poets_from_the_United_States.

Office Action dated Mar. 18, 2015, received in a related U.S. Appl. No. 13/605,339.

(56) References Cited

OTHER PUBLICATIONS

Chinese Office Action dated Mar. 23, 2015 from the corresponding Chinese application.

* cited by examiner

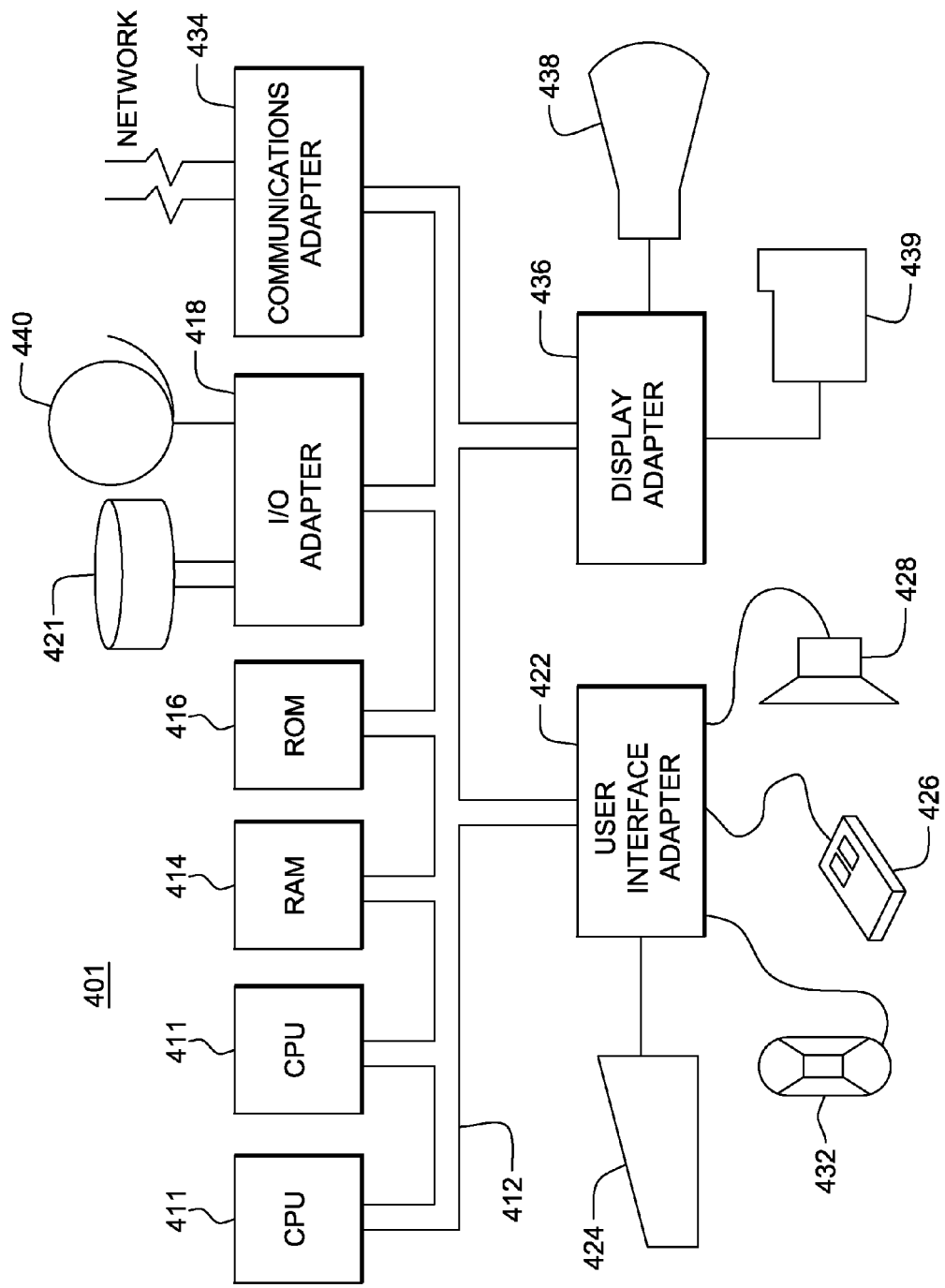

US 9,569,724 B2

USING ONTOLOGICAL INFORMATION IN OPEN DOMAIN TYPE COERCION

CROSS-REFERENCE TO RELATED APPLICATIONS

The present invention relates to and claims the benefit of the filing date of commonly-owned, U.S. Provisional Patent Application No. 61/386,019, filed Sep. 24, 2010, the entire contents and disclosure of which is incorporated by reference as if fully set forth herein.

BACKGROUND

An introduction to the current issues and approaches of question answering (QA) can be found in the web-based reference http://en.wikipedia.org/wiki/Question_answering. Generally, QA is a type of information retrieval. Given a collection of documents (such as the World Wide Web or a local collection) the system should be able to retrieve answers to questions posed in natural language. QA is regarded as requiring more complex natural language processing (NLP) techniques than other types of information retrieval such as document retrieval, and it is sometimes regarded as the next step beyond search engines.

QA research attempts to deal with a wide range of question types including: fact, list, definition, How, Why, hypothetical, semantically-constrained, and cross-lingual questions. Search collections vary from small local document collections, to internal organization documents, to compiled newswire reports, to the World Wide Web.

Closed-domain QA deals with questions under a specific domain, for example medicine or automotive maintenance, and can be seen as an easier task because NLP systems can exploit domain-specific knowledge frequently formalized in ontologies. Open-domain QA deals with questions about nearly everything, and can only rely on general ontologies and world knowledge. On the other hand, these systems usually have much more data available from which to extract the answer.

Alternatively, closed-domain QA might refer to a situation where only a limited type of questions are accepted, such as questions asking for descriptive rather than procedural information.

Access to information is currently dominated by two paradigms. First, a database query that answers questions about what is in a collection of structured records. Second, a search that delivers a collection of document links in response to a query against a collection of unstructured data, for example, text or html.

A major unsolved problem in such information query paradigms is the lack of a computer program capable of accurately answering factual questions based on information included in a collection of documents that can be either structured, unstructured, or both. Such factual questions can be either broad, such as "what are the risks of vitamin K deficiency?", or narrow, such as "when and where was Hillary Clinton's father born?"

It is a challenge to understand the query, to find appropriate documents that might contain the answer, and to extract the correct answer to be delivered to the user. There is a need to further advance the methodologies for answering open-domain questions.

SUMMARY

In one aspect there is provided a computing infrastructure and methodology that conducts question and answering and performs automatic candidate answer evaluation using a candidate answer scoring technique that maps candidate answer lexical types (LT) to query LAT instances (types) to produce a final TyCor score that additionally obtains and uses one or more ontologies for type matching and uses axioms/reasoning for considering type inclusion/exclusion Thus, in one aspect, there is provided a. computer-implemented system, method and program product for generating answers to questions comprising: receiving an input query text string; determining, by a programmed processor unit, a lexical answer type (LAT) string associated with an input query; automatically obtaining a candidate answer string to the input query from a data corpus; mapping the query LAT string to a first type string in a structured resource; mapping the candidate answer string to a second type string in the structured resource; and determining if the first type string and the second type string are disjointed; and scoring the candidate answer string based on the determination of the types being disjointed wherein the structured resource includes a semantic database providing ontological content.

Further to this aspect, the determining is carried out by identifying an axiom in the structured resource that relates the first type string to the second type string as being a disjointed.

In this further aspect, one or more axioms between types comprise: one or more of: equivalence axiom, subsumption axiom, and axioms of siblings between types.

In a further aspect, there is provided a system for generating answers to questions comprising: a memory; a processor device in communication with the memory that performs a method comprising: receiving an input query text string; determining, by a programmed processor unit, a lexical answer type (LAT) string associated with an input query; automatically obtaining a candidate answer string to the input query from a data corpus; mapping the query LAT string to a first type string in a structured resource; mapping the candidate answer string to a second type string in the structured resource; and determining if the first type string and the second type string are disjointed; and scoring the candidate answer string based on the determination of the types being disjointed wherein the structured resource includes a semantic database providing ontological content In this further aspect, the determining is carried out by identifying an axiom in the structured resource that relates the first type string to the second type string as being a disjointed.

In this further aspect, one or more axioms between types comprise: one or more of: equivalence axiom, subsumption axiom, and axioms of siblings between types.

A computer program product is provided for performing operations. The computer program product includes a storage medium readable by a processing circuit and storing instructions run by the processing circuit for running a method(s). The method(s) are the same as listed above.

BRIEF DESCRIPTION OF THE DRAWINGS

The objects, features and advantages of the invention are understood within the context of the Detailed Description, as set forth below. The Detailed Description is understood within the context of the accompanying drawings, which form a material part of this disclosure, wherein:

FIG. 8 illustrates an exemplary hardware configuration to run method steps described in FIGS. 2A-5 in one embodiment.

DETAILED DESCRIPTION

Figure 1:
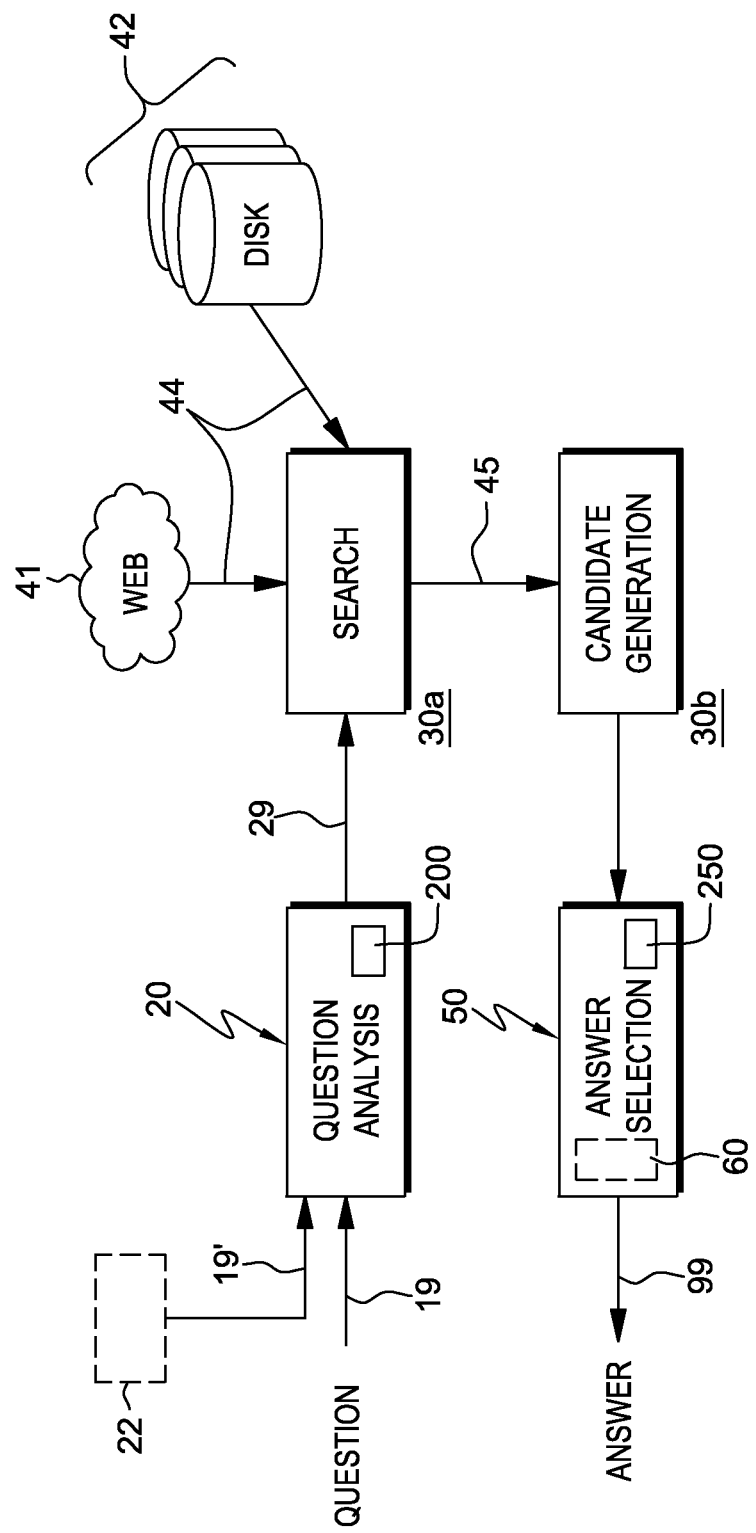
FIG. 1 shows a high level logical architecture 10 of a question/answering method in which the present invention may be employed.

FIG. 1 illustrates the major components that comprise a canonical question answering system 10 and their workflow. The question analysis component 20 receives a natural language question 19 (for example "Who is the $42^{nd}$ president of the United States?") and analyzes the question to produce, via functionality 200, the semantic type of the expected answer (in this example, "president"), and optionally other analysis results for downstream processing. A lexical answer type (LAT) block 200 in the query analysis module implements functions and programming interfaces to determine the LAT(s) of a query to be later used for candidate answer type matching. The search component 30a formulates queries 29 from the output of question analysis and consults various resources such as the World Wide Web 41 or one or more knowledge resources, e.g., databases, knowledge bases 42, to retrieve supporting evidence 44 including, e.g., whole documents or document portions, web-pages, database tuples, etc., that are relevant to answering the query/question. The candidate answer generation component 30b then extracts from the search results 45 potential (candidate) answers to the question, which are then scored and ranked by the answer selection component 50 to produce a final ranked list of answers with associated confidence scores.

In one type of question and answer system with deferred type evaluation, after the extracting of correct answers (i.e., candidate answer instances to queries obtained from a data corpus, a knowledge base, or open domain sources like the Internet), answer-typing is performed, i.e., a determination of associations between searched entities (i.e. candidate answers), and lexical types (LT). The determined candidate answer lexical type (LT) is compared against a computed lexical answer type ("LAT") string of the query which is detected prior by question analysis block 20, and an evaluation is made in determining the correctness of the answer.

That is, as part of the answer selection component 50, QA systems may utilize a type coercion (TyCor) process in which a lexical type of a candidate answer is "coerced" to the question LAT based on several techniques. The coercion process may involve candidate answer to instance matching, instance to type association extraction, and LAT to type matching. The results of the "coercion" are referred to as a TyCor score that reflects the degree to which the candidate may be "coerced" to the LAT, where higher scores indicate a better coercion.

The present invention provides a candidate answer type scoring process that maps candidate answer LT to query LAT instances to produce a final score that uses one or more ontologies for type matching; and further, uses axioms/reasoning for considering type inclusion/exclusion.

Commonly-owned, co-pending U.S. patent application Ser. No. 12/126,642, titled "SYSTEM AND METHOD FOR PROVIDING QUESTION AND ANSWERS WITH DEFERRED TYPE EVALUATION", incorporated by reference herein, describes a QA system and method in which answers are automatically generated for questions that involves comparing the query LAT to the candidate answer LTs associated with each candidate answer.

The present disclosure extends and complements the effectiveness of the system and method described in co-pending U.S. patent application Ser. No. 12/126,642 by implementing a modified TyCor process to evaluate candidate answers to produce a final candidate answer score using one or more ontologies from an ontological resource. An ontological resource may include a semantic knowledgebase (KB), or any database that contains instances along with some concepts or types associated with it. The semantic KB is linked to the structured resource for type matching, and axioms/reasoning are identified in the ontological resource for considering type inclusion/exclusion. As will be described herein, ontological information is accessed during the TyCor scoring process by automatically accessing the semantic knowledgebase (KB).

For purposes of illustration, in one embodiment, a semantic KB including ontological information that is automatically accessed during the TyCor scoring process described herein below is a semantic database such as the web-based resource YAGO ("Yet Another Great Ontology") providing an interface that allows users to pose questions (to YAGO) in the form of queries on the YAGO homepage (http://www.mpi-inf.mpg.de/yago-naga/yago/) incorporated by reference herein. YAGO's semantic knowledge-base includes content automatically extracted from Wikipedia® (at http://www.wikipedia.org/) a registered trademark of Wikimedia Foundation, Inc., San Francisco Calif.) and WordNet® (http://wordnet.princeton.edu/) a registered trademark of Trustees of Princeton University, The Princeton University, Princeton, N.J., to provides structured ontological information. A further semantic database includes the web-based resource DBpedia (www.DBpedia.org) which is a web-based resource that provides structured information automatically extracted from the knowledgebase, Wikipedia®.

Moreover, ontological information maybe further automatically accessed using the web-site WordNet® that enumerates all senses of concepts (words). For example, a concept in Wordnet® may have multiple senses, e.g., the concept (word) "star" in Wordnet® can mean an astronomical object or a movie "star". In one embodiment, YAGO concepts are automatically linked to the web-site WordNet®. A type coercion process that uses ontological information accesses such as DBpedia/YAGO and/or WordNet® may improve both the quality and coverage of TyCor scoring.

In one embodiment, the use of "ontologies" in a TyCor scoring process includes the identification and use of "axioms". One axiom is referred to as a disjointness axiom that can be used to generate a negative TyCor score (referred to as "AnTyCor" score) and used to eliminate incorrect candidate answers to a question. An "axiom" is alternately referred to herein as a "logical rule" (represents, for example, a subclass rule, or an equivalent-class rule).

Figure 3A:
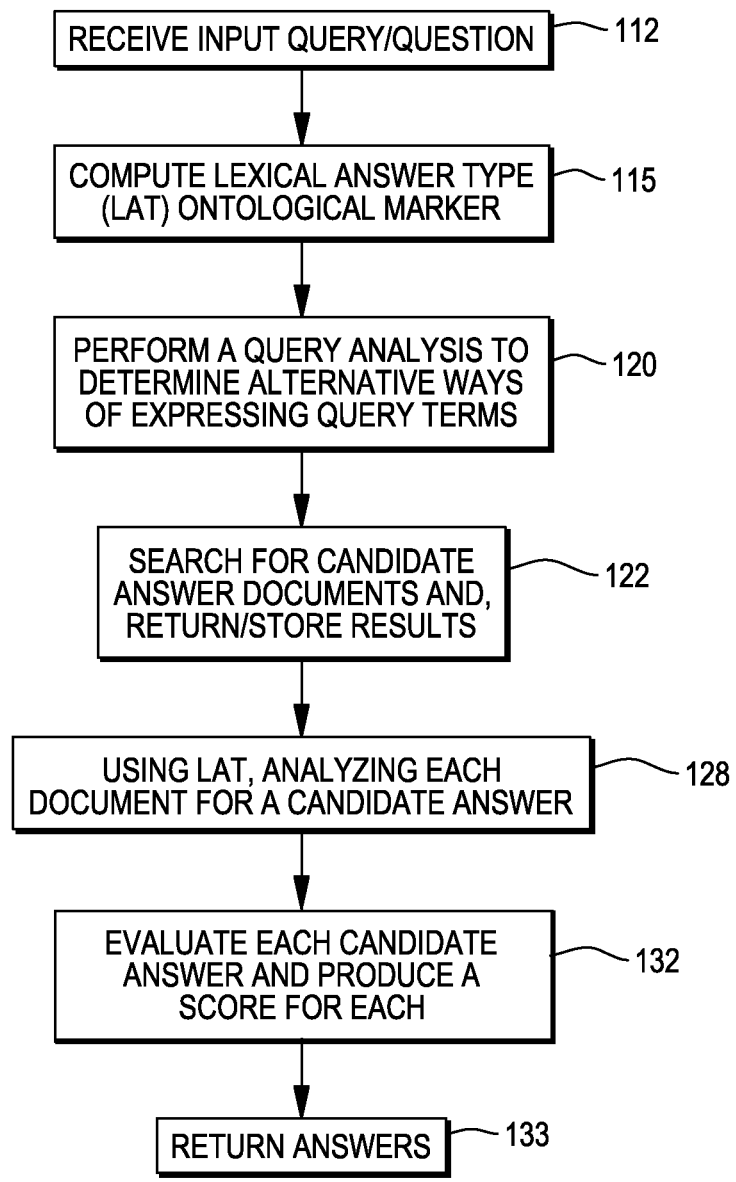
FIG. 3A is a flow diagram illustrating a computer programmed candidate answer generation process 100 for conducting questions and answers with deferred type evaluation.

Reference is had to FIG. 3A that depicts a flow diagram of a computer programmed method 100 for conducting questions and answers with deferred type evaluation leading to generation of a candidate answer TyCor score such as described in co-pending U.S. patent application Ser. No. 12/126,642.

Generally, in the method of "deferred type evaluation" depicted in FIG. 3A, a first processing 112 represents the step of receiving, at a processing device, an input query, and generating a data structure including a question string and context for input to a Lexical Answer Type (LAT) processing unit block 200 (of FIG. 1) where, as indicated at 115, the Query is analyzed and lexical answer type (LAT) is computed. As a result of processing in the LAT processing component, as run at 115, there is generated an output data structure including the computed LAT and possibly additional terms from the original question.

As result of processing in the LAT block 200 then, as typified at 120, there is generated an output data structure including the computed original query (terms and assigned weights) in a manner such as described in co-pending U.S. patent application Ser. No. 12/152,441 the whole contents and disclosure of which is incorporated by reference as if fully set forth herein.

Returning to FIG. 3A, then, at processing 122, there is performed searching for candidate answer documents in a data corpus having structured and semi-structured content, and returning the results.

As a result of processing in a candidate answer generation module, as typified at 122, there is generated an output data structure including all of the documents found from the data corpus (e.g., primary sources and knowledge base).

Then, at 128, there is depicted the step of analyzing, using the generated LAT (the lexical answer type), each document for a candidate answer to produce a set of candidate answers.

Then, at 132, there is performed evaluating each candidate answer and producing a score for each candidate answer using ontological information in the embodiment described herein. The result of the modified TyCor processing in accordance with the embodiments described herein, produces candidate answer scores, and the answer(s) are returned at step 133 (based on their scores).

Figure 3B:
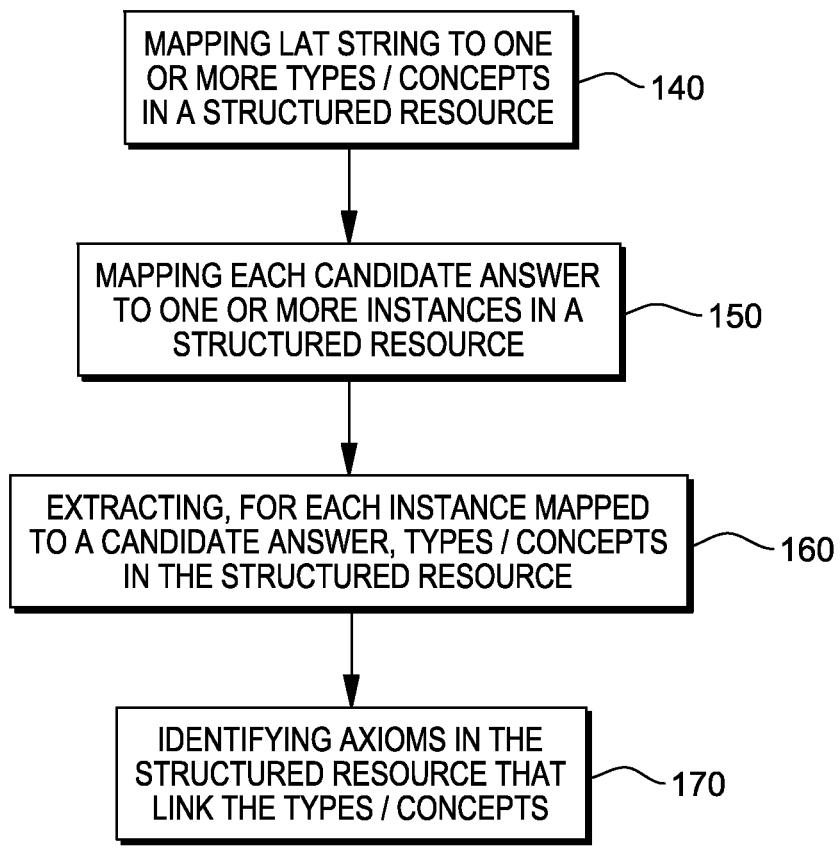
FIG. 3B depicts a flow diagram illustrating score production performed at step 132 of FIG. 3A according to one embodiment.

FIG. 3B depicts a flow diagram illustrating candidate answer evaluation and score production performed at step 132 of FIG. 3A according to one embodiment. The evaluating performed for a candidate answer received includes TyCor score processes as shown in FIG. 3B that includes: mapping the LAT string to one or more lexical types or concepts in a structured resource at 140; mapping each candidate answer to one or more instances in a structured resource at 150; extracting, for each candidate answer or instance mapped to a candidate answer, one or more lexical types or concepts in a structured resource at 160; and identifying one or more axioms in said structured resource that links the lexical type mapped to the LAT string to the lexical type mapped to the instance which in turn is mapped to the candidate answer at 170.

Thus, as shown at 140, FIG. 3B, there is performed the mapping of the LAT string derived from the query to one or more lexical types or concepts in a structured resource by accessing a resource having ontological content, for example a semantic database such as YAGO and/or WordNet®, and finding the types or concepts based on the LAT.

In one embodiment, there is performed accessing the semantic database and obtaining type or concept entities that match the LAT string. A matching function is invoked that returns a ranked list of mappings associated with some confidence. A word sense disambiguation function may be used to perform the mapping step that maps a word to a correct sense. A word sense disambiguation function may be used as described in Agirre, Eneko & Philip Edmonds (eds.), 2006, Word Sense Disambiguation: Algorithms and Applications. Dordrecht: Springer. www.wsdbook.org; or Yarowsky, David. 2000, "Word sense disambiguation. Handbook of Natural Language Processing", ed. by Dale et al., 629-654. New York: Marcel Dekker. or Ide, Nancy & Jean Veronis, 1998, "Word sense disambiguation: The state of the art. Computational Linguistics", 24(1):1-40. For example, a LAT "star" could be used in the "astronomical object" sense, or it could be in the "movie actor" sense, which is automatically inferred using context to obtain the mapping. As different words have different senses corresponding to different concepts, the mapping will provide the different interpretations with a confidence score. The context, i.e., a prior knowledge, or a bias, is input to the matching function to discern the senses.

Figure 4:
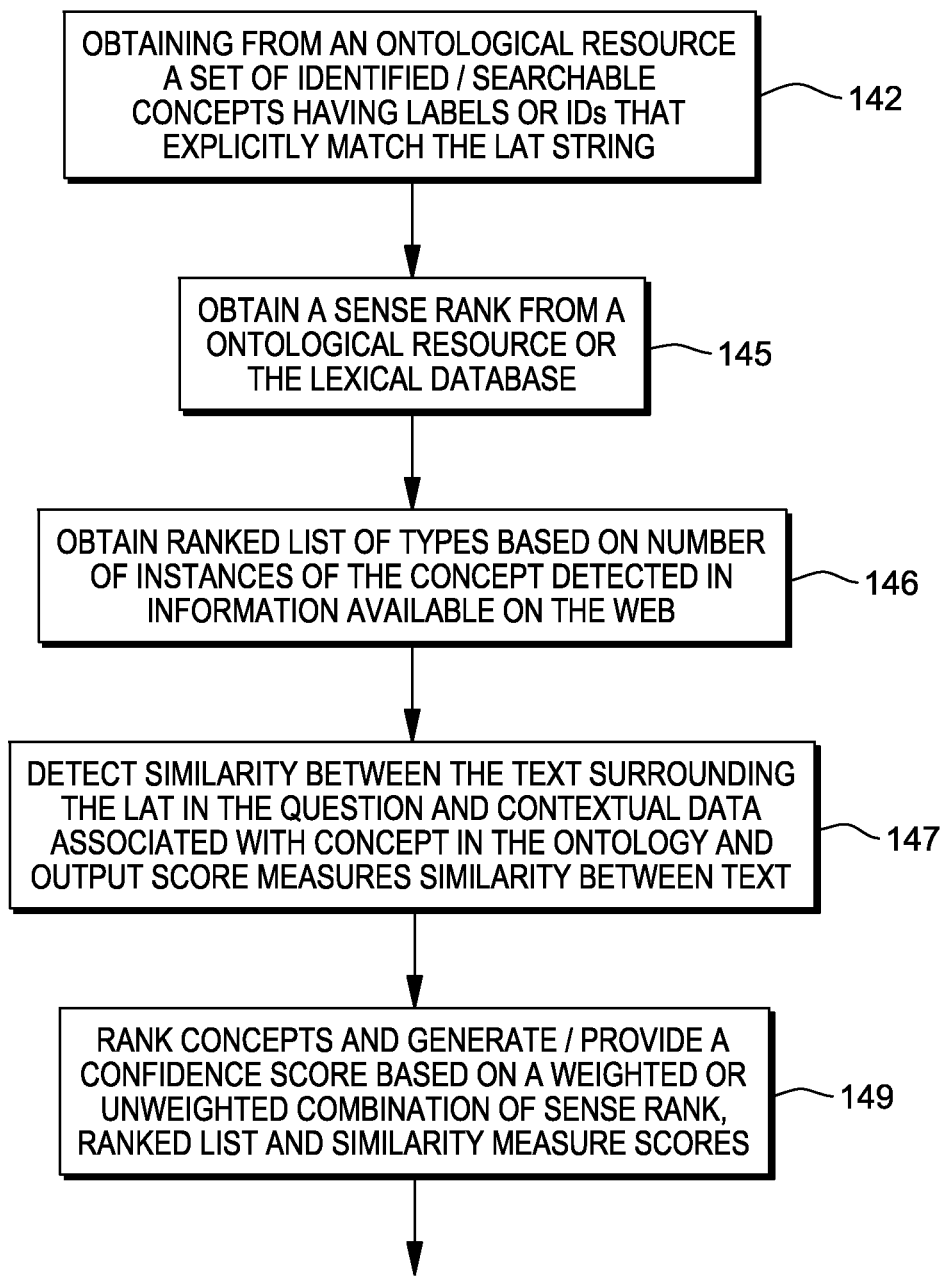
FIG. 4 depicts a flow diagram illustrating mapping of a LAT string to Types using an ontological resource as performed at step 140 of FIG. 3B.

FIG. 4 shows a detailed score generation process of the mapping of the LAT string to the types from the structured database at 140 of FIG. 3B that utilizes ontological information in one embodiment. There is first performed at 142 obtaining, e.g., from conducting a search in an ontological resource, e.g., YAGO and/or WordNet®, a set of identified/searchable concepts having labels or IDs that explicitly match the LAT string. Then, starting at 145, there is obtained three pieces of information, a processing component performs obtaining the LATs "sense" rank, such as provided by WordNet®. Then, at 146, a processing component, such as a search engine, conducts a search of a structured data resource knowledge base, database, a data corpus or the Web, to obtain the number of instances of the concept. For example, a knowledge base Wikipedia® pages include categories having links (e.g., categories) which are treated as a "type", however a link is provided between Wikipedia® and DBpedia (e.g. via use of a 1:1 mapping between URLs) as DBpedia provides a more structured view of Wikipedia® page content. Step 146 produces a ranked list of types based on detected number of instances (i.e., frequency) of the concepts, e.g., in information available on the Web.

As mentioned, when mapping the question LAT to a typing system, there may be further performed a word sense disambiguation by taking into account the entity and the context in which it appears in the question (context is needed to disambiguate the entity). Thus, at 147, a processing component implements functions to compute a similarity measure (score) between the text surrounding the query LAT string and contextual data associated with concept in the ontological resource (or ontology). This includes, via a processing search engine: 1) identifying context in the question and obtaining a representation/model of the context; and 2) implementing function to measure and score the similarity between the contexts based on the representation.

As an example, a type "film" can refer to a "photographic film", or "a movie". In one embodiment, for the mapping, the context of the question is used in addition to information from various sources such as Wordnet® (e.g., to get sense information for nouns ("types"), type popularity scores from a domain corpus (e.g., "gem" as a precious stone is more popular than "gem" as a person), a background knowledge resource about relations that inform which are the typical relations/predicates associated with the noun (e.g., "sold this gem" lends more evidence to gem as a precious stone rather than person).

Then, at 149, the process generates a first confidence score based on a weighted combination of sense rank, ranked list and similarity measure scores obtained at steps 145, 146 and 147. Alternatively, a confidence score may be based on an un-weighted combination. In the case of a weighted combination, a weighting is applied to each of the scores to provide an overall confidence score based on a weighted combination of these outputs. This can be done for example using a machine-learning algorithm such as a Logistic Regression as described in David W. Hosmer, Stanley Lemeshow, "Applied logistic regression". John Wiley and Sons, 2000, incorporated by reference herein. The raw scores obtained may be input to the machine learning process that generates weights that are applied to the individual scores; e.g., a context similarity score may be given a higher weight due it its importance in ascertaining the sense. It should be understood that one or more of the steps 145-147 may be performed to provide the mapping LAT string to lexical type scores with one or more of the generated outputs utilized in the final score generation with the mappings and associated confidence scores maintained in a memory storage device.

In one embodiment, the raw scores (145, 146 and 147) may be simply combined in an applied combination function, i.e., summed, into a final score and these can be added without weights applied.

Returning to FIG. 3B, at 150 there is performed mapping each candidate answer against instances found in a structured resource such as Wikipedia® and DBpedia. For example, the candidate answer is mapped to instances in a Wikipedia (DBpedia) page resulting in generating an output data structure, including the mapped instances.

Figure 5:
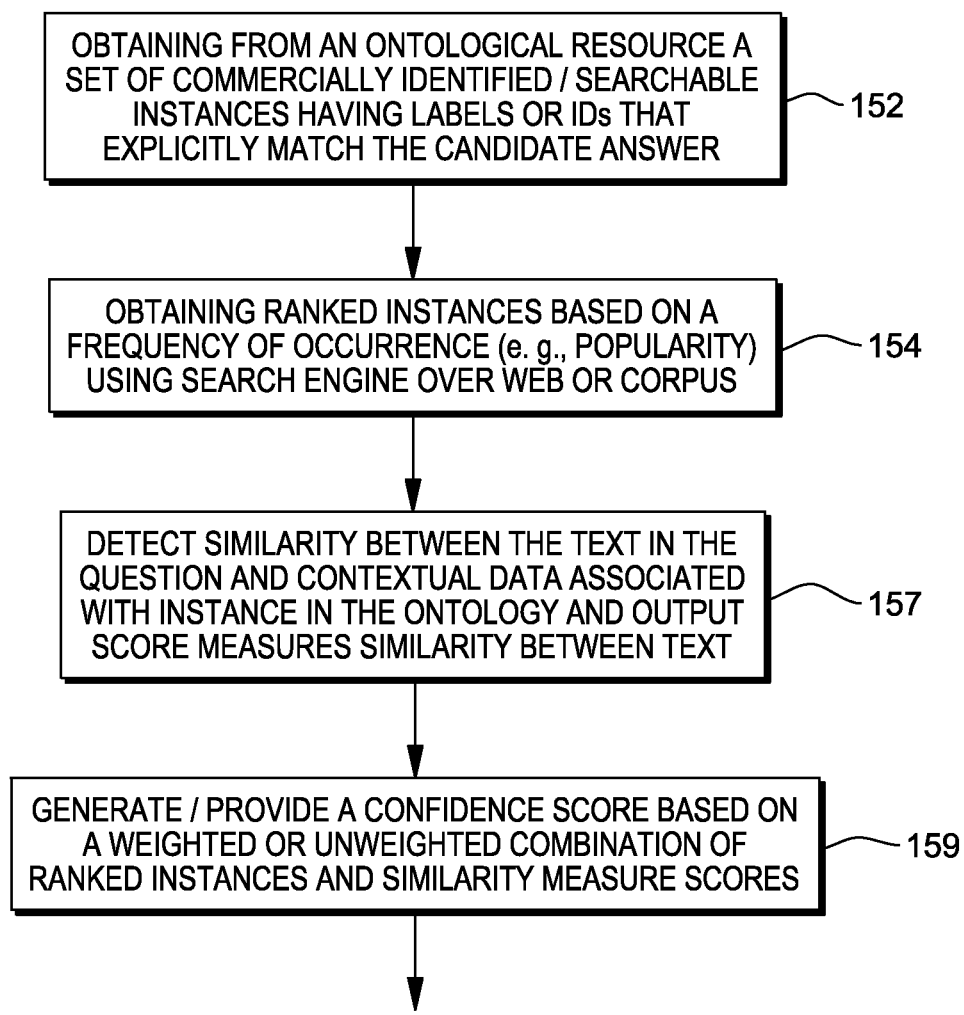
FIG. 5 depicts a flow diagram illustrating mapping of a candidate answer to Instances in a data resource using as performed at step 150 of FIG. 3B.

FIG. 5 shows a detailed score generation process of the mapping of the candidate answer string to instances in a structured database at 150 of FIG. 3B that utilizes a data resource having structured content or information in one embodiment. There is first performed at 152 obtaining, e.g., from conducting a search in a structured resource, e.g., Wikipedia® and DBpedia, a set of commercially identified/searchable instances having labels or IDs that explicitly match the candidate answer string. Then, at 154, a processing component, such as a search engine, conducts a search of the structured data resource knowledge base, database, a data corpus or the Web, to obtain the number of instances of the candidate answer. Step 154 produces a ranked list of instances based on detected number of instances (i.e., frequency) of the instances, e.g., in information available on the Web or a corpus. Then, at 157, a processing component implements functions to compute a similarity measure (score) between the text in the question/query string and contextual data associated with the instance in the ontological resource (ontology). Then, at 159, the process generates a confidence score based on a weighted (or unweighted in an alternate embodiment) combination of the ranked instance list and similarity measure scores obtained at 154 and 157. This step may include applying a weighting to each of the scores to provide an overall confidence score based on a weighted combination of these outputs. It should be understood that one or both of the steps 154 and 157 may be performed to provide the mapping of candidate answer string to instances in the structured resource with one or more of the generated outputs utilized in the final score generation with corresponding mappings and associated confidence scores maintained in a memory storage device.

In one embodiment, the use of context, e.g., particularly, at step 147 in FIG. 4 and step 157 in FIG. 5, involves obtaining the text in the query or relating to the query as surrounding context for use in determining the similarity. In the case of the LAT string, at 147, FIG. 4, the question LAT context is used in the matching to concepts or types in the ontological resource to obtain corresponding matching scores; and in the case of the candidate answer string, at 157, FIG. 5, the question context is used in the matching to instances in the structured resource to obtain corresponding matching scores. For example, the entity "Washington" is ambiguous in that it can refer to a person (George Washington), a city (Washington D.C.), an institution (Univ. of Washington), a state (Washington), etc. Thus, there is performed a determining of the correct sense of an entity dependent upon the context in which it appears. Thus, in one embodiment, similarity measure scores includes applying functions such as: aligning the context using BOW (bag of words) model such as described in http://en.wikipedia.org/wiki/Bag_of_words_model, or applying a vector similarity model approach such as described in http://en.wikipedia.org/wiki/Vector_space_model. A variety of information in encyclopedic and the structured resources such as Wikipedia®, and DBpedia may be used to obtain, e.g., alternate names, possible disambiguations, etc. Further, the discerning of types or instances from among noisy types or instances may require disambiguation. For example, given mappings of candidates to two different type systems, obtaining types from each type system may require disambiguation or type alignment, e.g., such as described in Agirre, Eneko & Philip Edmonds (eds.), 2006 entitled "Word Sense Disambiguation: Algorithms and Applications", Dordrecht: Springer. www.wsdbook.org.

For the context similarity measuring, there is accessed in Wordnet® the association(s) with every concept that includes a description of what concept means and examples of where the word appears in text. These descriptions provide a concept. In accessing YAGO, associated with every concept, there is included context in the form of a comment as opposed to a description.

Returning to FIG. 3B, at 160, there is provided identifying, for each candidate answer, one or more types or concepts in the structured resource. In one embodiment, the identifying may be performed using the one or more instances obtained at 150, however, it not necessary. Further to this step, there may be additionally performed extracting the one or more types of concepts for storage in a memory storage device.

Thus, at 160, once a candidate string has been mapped to an instance in a structured KB, there is performed obtaining the types for the entity involved, checking its type assertions (instance types or ITs), and navigating the type taxonomy to pull out all relevant types. Techniques to seek and find popular types associated with the entity in a large domain corpus are performed.

For example, in the case of a relative ambiguous candidate string, e.g., "JFK"—meaning a person, an airport, or a movie, there is first discerned the context to disambiguate the entity. Any disambiguation using context of the question including the entity, is performed at the time of mapping the entity to some knowledge base (e.g., Wikipedia® or DBpedia that may include type information) at 150. In an example candidate string "JFK", from the context it is inferred that JFK refers to a president type. This may be mapped to a JFK entry in a Wikipedia® page to obtain types ("U.S. president", "politician", "senator", "writer", etc.) for example that may be extracted from a "category" section of the Wikipedia page which may include type words or phrases. This may be performed a search engine in conjunction with a parser to extract the types. In one embodiment, the parser includes intelligence that looks for head noun of a phrase, for example to extract the relevant type.

Finally, as indicated at 170, there is identified from the structured ontological resource (e.g., YAGO/Wordnet®) one or more axioms in the structured resource that links the one or more LTs to ITs, i.e., specifies a relationship between the LTs to ITs, to produce candidate answer and LAT string score. An identified axiom(s), for example, a sub-class or sub-type links are identified among candidate instance (/types) and LAT instance (/types) and used to modify the final TyCor score. A Type alignment function may first be implemented as described in Aditya Kalyanpur, J. William Murdock, James Fan and Christopher Welty, in "Leveraging Community-built Knowledge for Type Coercion in Question Answering", Proceedings of ISWC 2011, incorporated by reference herein.

In one embodiment, an example "disjointness" axiom(s) may be provided in the ontological resource and used to generate an AnTyCor score as now described:

As a non-limiting illustrative example, suppose a question LAT is "country" and the candidate answer is "Albert Einstein", which has a type of Person in the structured resource. The presence of a "disjointness" axiom between the types Person and Country will produce a negative TyCor score for the candidate (i.e., AnTyCor score having a −1 value, for example). Even when no explicit disjointness axioms are defined in the ontology, disjointness may be statistically inferred from the instance data and used to generate the AnTycor score as described in the incorporated by reference: Aditya Kalyanpur, J. William Murdock, James Fan and Christopher Welty, in "Leveraging Community-built Knowledge for Type Coercion in Question Answering", Proceedings of ISWC 2011.

Further to this example, if the types Country and Person have no common instances in a very large structured source, it is inferred that they are statistically disjoint with a certain degree of confidence. The "completeness" of a type may be estimated and used to define an AnTyCore score.

As mentioned above, ontological axioms (i.e., axioms defined in the ontology) are either factual assertions or rules of inference.

Example: 1) "Albert Einstein is-a Scientist"—is a factual assertion;

Example 2) "Scientist is-a Person" is a simple subclass axiom/rule, which states that every instance of the concept Scientist is also an instance of the concept Person (i.e., a collection of such sub-class axioms forms a taxonomy).

Example 3) "Person is-disjoint-with Country" is a disjointness axiom which states that an instance of the concept Person cannot be an instance of Country (i.e. the two concepts are mutually exclusive).

Such rules/axioms are either defined manually by domain experts and/or acquired (semi-) automatically using knowledge mining techniques from a large corpus. Thus, for example, given a question that asks for a Country, a candidate answer "Albert Einstein" is computed from Wikipedia®. Using above Examples (1)-(3) processing, a record for "Albert Einstein" is accessed from a structured knowledge base such as DBpedia which obtains "types" (as types are assigned to instances in DBpedia records) or, accessed from the ontology from YAGO or Wordnet® (that provides on-line an ontology of many concepts) and in which it is inferred that since Einstein is a scientist, he is also a "type" person, and hence is not a "type" country. Hence, this candidate answer will be assigned an AnTyCor score (negative TyCore score).

Figure 6:
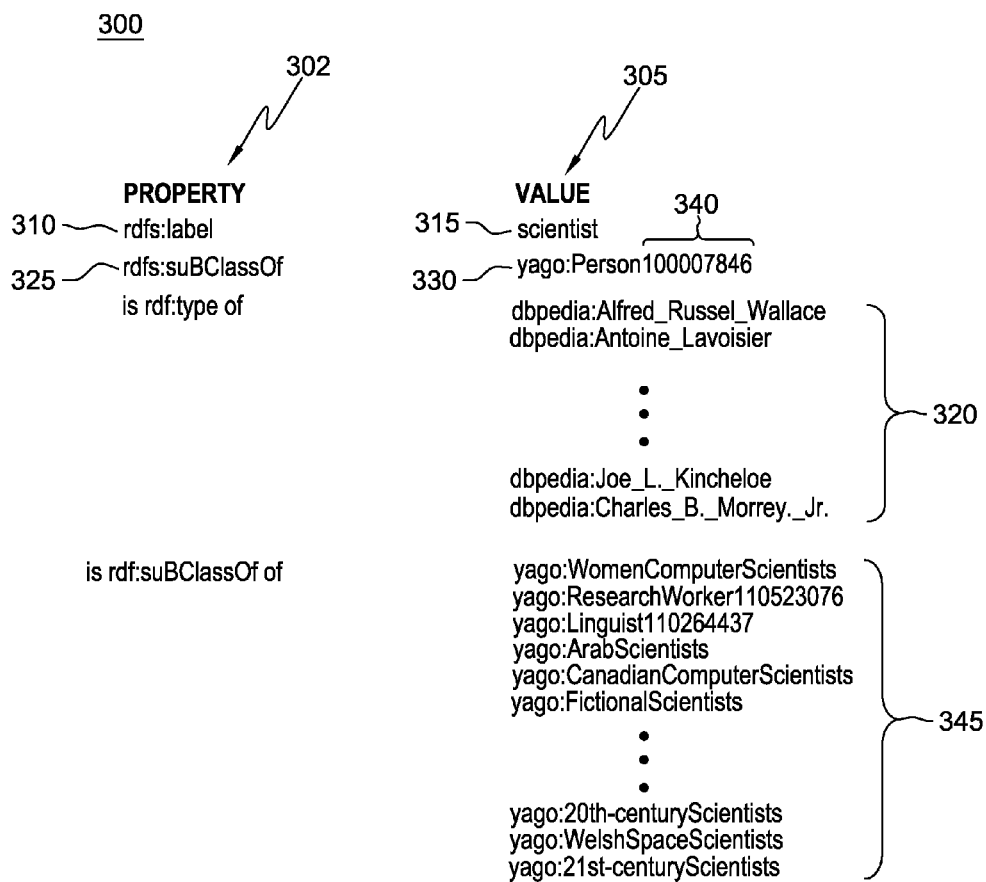
FIG. 6 depicts an excerpt of a structured knowledge base such as a DBpedia page that is tightly interlinked with a YAGO type.

For example, FIG. 6 shows an excerpt of a structured knowledge base such as a DBpedia page that defines, and being tightly interlinked with YAGO resource, a YAGO type. In FIG. 6, the DBpedia page 300 provides a list of properties 302, and corresponding property values 305. One searchable property is a label 310 having a value indicating the type, e.g., "Scientist" 315. Further instance values of type "scientist" are shown as a list of instances 320, e.g., Alfred_Russel_Wallace, Antoine_Lavoisier, etc. Thus, a search of the corresponding DBpedia page source code will automatically obtain an instance "type" for a candidate answer instance. Further shown is a list of sub-types 345 of the given type—in this example, sub-types of type Scientist 315, such as "Canadian Computer Scientist", "Welsh Space Scientist" etc. As indicated in FIG. 6, the page 300 further includes an additional entry indicating a property of type "scientist" as a subclass 325 of the type "Person" 330, e.g., indicated by the entry: yago:Person100007846. That is, the DBpedia page 300 specifies a subclass axiom 325 which indicates that type "Scientist" is a subclass of "Person". The corresponding identifier 340 at the end of the type name refers to a searchable WordNet® sense for this type. In one embodiment, for the case of disjointness axioms, these are added to YAGO between YAGO types. For example, Type "Person is disjoint with Location".

The way this axiom is used in AnTyCor is the following: Considering the query LAT: "Country" and Candidate: "Albert Einstein". 1. CHAI processing is used on the above candidate answer to obtain http://dbpedia.org/page/Albert_Einstein; 2. The type strings for the candidate answer are obtained by accessing http://dbpedia.org/class/yago/Scientist110560637 (from 1); 3. LATTE processing is used to obtain type strings for the query LAT by accessing: http://dbpedia.org/class/yago/Country108544813; and 4. TATA processing compares the type string (from 2) and the type string (from 3) which produces a score of −1, for example, because the two types are disjoint. This disjointness is found by a reasoner because Scientist is a sub-type of Person, and Country is a sub-type of Location, and there has been added an axiom or rule that Person is disjoint-with Country. Hence, the final TyCor score produced at the end of step 4 is the −1 AnTyCor score.

As a further example, assuming it is known a priori that the coverage for a particular type in the structured resource is very high, then under a closed world assumption, any instance that is not of the concerned type may be assigned a (negative) AnTyCor score.

In a further embodiment, a logical reasoner component such as described in A. Riazanov and A. Voronkov entitled "The Design and Implementation of Vampire. AI Communications", 15(2-3):91-110, 2002, may be implemented to infer connections between instances and LAT types (when no explicit links exist), and thus improve TyCor coverage.

As an example, supposing the question LAT is "Canadian" and the candidate answer string is "Wayne Gretzky", and it is known from a structured text resource (e.g., DBPedia) that "Wayne Gretzky" was born in Ontario, Canada. Using a logical reasoner and axioms about nationality, it is inferred that he is a Canadian, even without the presence of explicit type information, and thus produce a meaningful TyCor score.

In further embodiments, axioms about equivalence, subsumption, and siblings between types are treated differently to produce finer grained TyCor scores based on the type of match. This information may be further be used as features in the TyCor model.

Further, sibling axioms show type relatedness without disjointness, e.g., a painter type and musician type are both sub-types of person, and these may be found in the Wordnet®, for example. These may be assigned a very small score in the computing the candidate answer score. This score can be manually assigned based on empirical analysis of the data or be automatically learned using machine learning techniques such as Logistic Regression.

Further, subsumption axioms indicate types in sub-type relationships, e.g., "president" is a sub-type of "person", so a relatively higher score may be assigned in the computing the candidate answer score.

Further, equivalence axioms indicate a synonymous type relationship, e.g., a type "man" and a type "male" person are synonymous, so a relatively higher score may be assigned in the computing the candidate answer score.

Figure 2A:
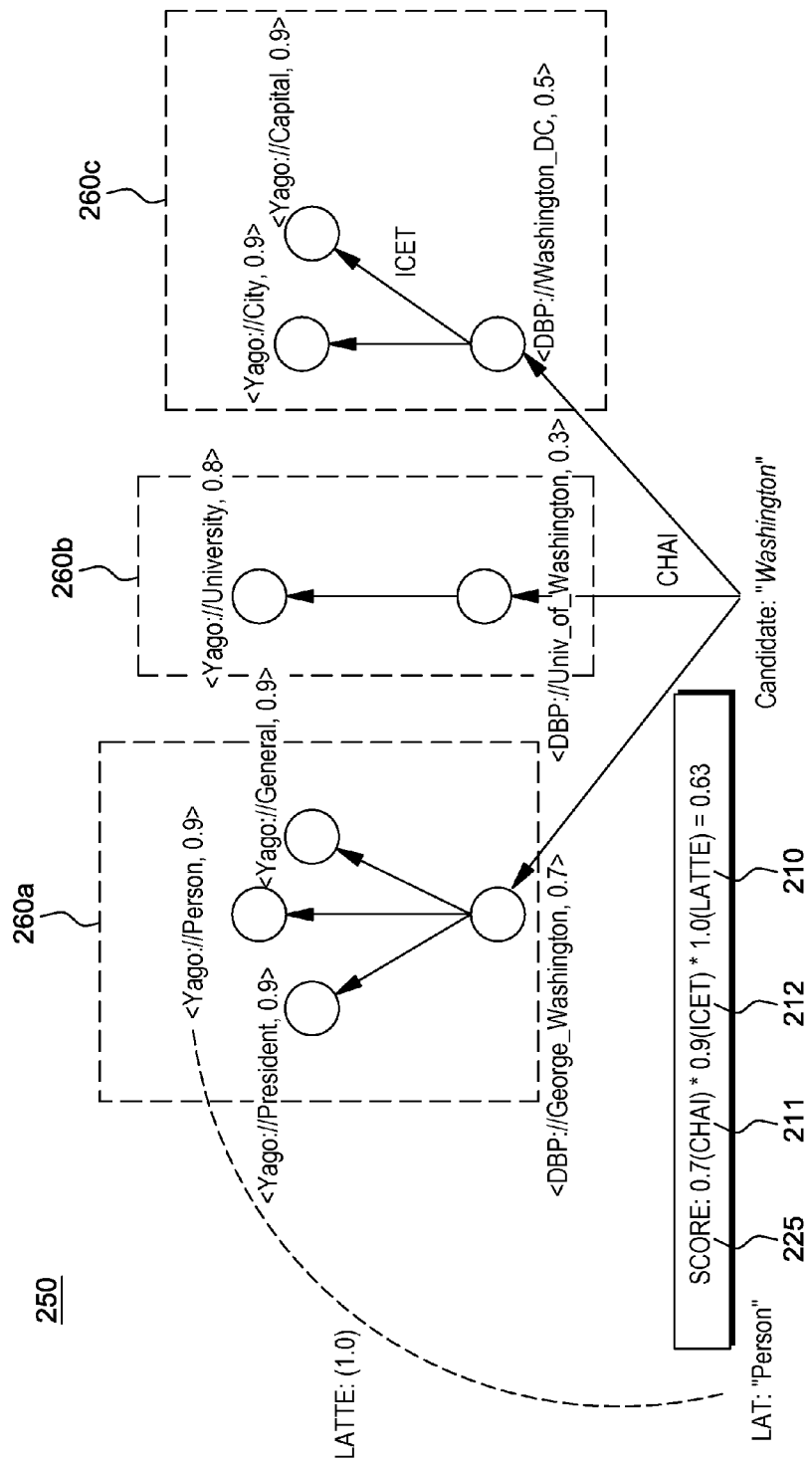
FIG. 2A depicts a candidate answer score process 250 that takes as input two strings: a determined LAT, and a candidate answer, and ascertains the degree of type match.

FIG. 2A shows an example TyCor processing component 250 takes as input two strings: the determined LAT, and candidate answer, and ascertains the degree of type match (whether the candidate answer type matches the query LAT or not). Thus, for a LAT "person" and a candidate answer of "Washington", having a possible lexical type "person", there is agreement and potentially a high value TyCor (confidence) score. As shown in FIG. 2A, the TyCor processing 250 performs one or more parallel processing functions that produce individual scores as described herein. A process known as LATTE is invoked to produce a LATTE score 210. The LATTE score represents a degree of match between the query LAT and a type in a structured database, in this example, YAGO. In the example, the LAT is "person" and matches perfectly with the type "person" in the structured database (i.e. YAGO). In this example, a value of 1.0 indicates an exact type match. Additionally, a process known as CHAI is invoked to produce a CHAI score 211. The CHAI score represents a degree of match between the candidate answer string to instances in a knowledge base, such as DBpedia. Additionally, a process known as ICET is invoked that produces an ICET score 212. The ICET score represents a degree of match between an instance in a knowledge base mapped to the candidate answer and a type in a structured database, in this example, YAGO. In FIG. 2A, three examples of the ICET process are shown at 260a, 260b and 260c. As shown, a TyCor score 225 is produced as a combination, e.g., summation or product, of the individual LATTE 210, CHAI 211 and ICET 212 scores.

Figure 2B:
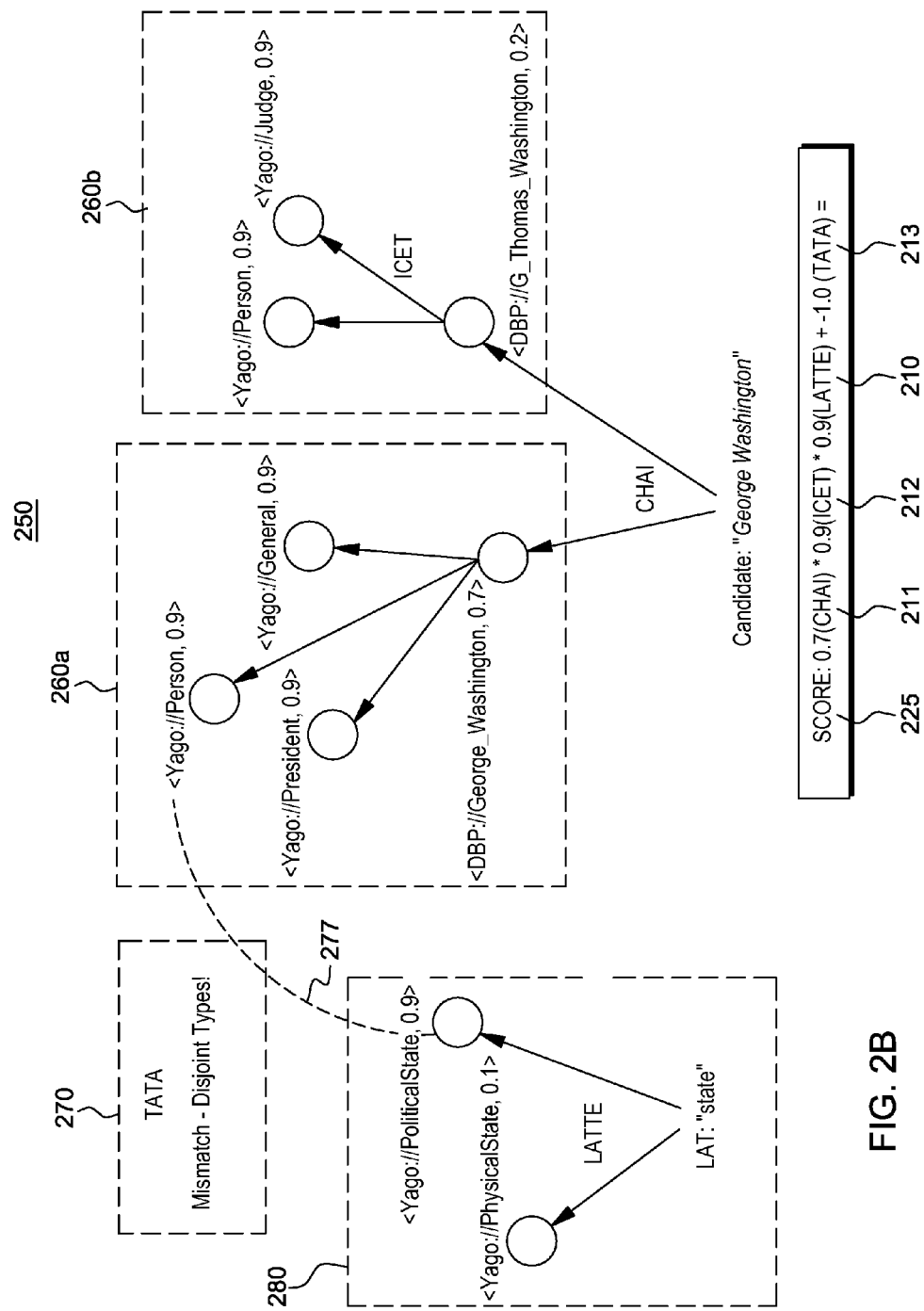
FIG. 2B shows an additional candidate answer score process 275 that performs mapping of a LAT string to Types utilizing ontological information from an ontological resource, according to one embodiment.

FIG. 2B shows an example TyCor processing component 250 with the additional process 270 in accordance with the additional process step 170 of FIG. 3B. Generally, as shown in FIG. 2B, example inputs to the TyCor processing component 250 are LAT input string of "state" and a candidate answer string of "Washington". Again, the TyCor processing component 250 performs parallel processing functions that produce individual scores. The process includes accessing an ontological resource, such as YAGO or Wordnet®, where all word senses are enumerated. That is, the knowledge base or information source is automatically linked to the ontological resources (YAGO or Wordnet®).

In the example shown, the LATTE processing 280 of input string "state" produces LATTE scores by matching the input string "state" to instance strings, for example "PoliticalState" and "PhysicalState", in a ontology database such as in YAGO. In this example, a higher score (0.9) is obtained when matched against a political state and a lower score (0.1) when matched against a physical state. This score is computed based on the context of the question and background prior knowledge using machine learning techniques. Details of how this is done are explained in U.S. patent application Ser. No. 12/126,642, incorporated herein by reference.

Further, in the example shown, the CHAI processing of input candidate string "Washington" will yield a ranked list of instances from a structured knowledge base that match the string "Washington", such as "George Washington (President)", "Washington (State)", or "Washington DC (city)". Each instance is associated with a corresponding score based on the context of the input string and background prior knowledge. In the example shown, two instances are shown "George_Washington" receiving a CHAI score of (0.7) and "G_Thomas_Washington" receiving a CHAI score of (0.2). Again, details of how the scores are computed are explained in U.S. patent application Ser. No. 12/126,642, incorporated herein by reference.

Further, ICET processing 260a and 260b computes ICET scores for each of the types for the instances produced in the CHAI step. For example, the instance of "George Washington" has mapped types Person, President and General each receiving a different ICET scores. Again, details of how the scores are computed are explained in U.S. patent application Ser. No. 12/126,642, incorporated herein by reference.

The new processing step introduced in FIG. 2B is referred to as TATA (type to type alignment) processing 270. The TATA processing 270 compares the types mapped to the LAT with the types mapped to the instances which were mapped to the candidate answer. Again, a TATA score 213 is produced representing whether there is a match between the types. At this step 270, one embodiment of the invention uses axioms or logical rules in the ontology to ascertain a measure of disjointedness referred to as an AnTyCor score or negative TyCor score. Thus, as shown in FIG. 2B, a TATA score 213 (i.e. AnTyCor or negative TyCor) is produced representing that the type "Political State" mapped to the LAT is found at 277 to be disjoint with the type "Person" mapped to the instance "George Washington" which in turn was mapped to the candidate answer. In other embodiments, even when no explicit axioms are defined in an ontology, it is possible to statistically infer disjointedness from the type date and use it to generate an AnTyCor score. For example, if the types, such as "Country" and "Person", have no common instances in a large structure source then a statistical disjointedness can be inferred. In another embodiment, it is possible to estimate the "completeness" of a type and use this estimate to determine an AnTyCor score. For example, suppose it is known a priori that the coverage for a particular type in the structure resource is very high, then, under a closed world assumption, any instance that is not of the concerned type can be assigned a AnTyCor score or negative TyCor score. In yet another embodiment, using a logical reasoner, it is possible to infer connection between types, even when no explicit links exist, and thus improve the TyCor score. For example, if the query LAT is "Canadian" and the candidate answer string is "Wayne Gretzky", and it is known from the structured resource that "Wayne Gretzky" was "born in Ontario, Canada", then using a logical reasoner and axioms about nationality, it is possible to infer that "Wayne Gretzky" is "Canadian" without the explicit type information, and thus a better TyCor score can be calculated. In yet another embodiment, axioms about equivalence, subsumption, siblings, etc. between types can be treated differently to produce finer grained TyCor scores and this information can also be used as features in a TyCor model.

As mentioned, FIG. 1 shows a system diagram described in U.S. patent application Ser. No. 12/126,642 depicting a high-level logical architecture 10 and methodology in which the system and method for deferred type evaluation using text with limited structure is employed in one embodiment.

Generally, as shown in FIG. 1, the high level logical architecture 10 includes the Query Analysis module 20 implementing functions for receiving and analyzing a user query or question. The term "user" may refer to a person or persons interacting with the system, or refers to a computer system 22 generating a query by mechanical means, and where the term "user query" refers to such a mechanically generated query and context 19'. A candidate answer generation module 30 is provided to implement a search for candidate answers by traversing structured, semi structured and unstructured sources contained in a Primary Sources module 11 and in an Answer Source Knowledge Base (KB) module 21 containing collections of relations and lists extracted from primary sources. All the sources of information can be locally stored or distributed over a network, including the Internet.

The Candidate Answer generation module 30 of architecture 10 generates a plurality of output data structures containing candidate answers based upon the analysis of retrieved data. In FIG. 1, an Evidence Gathering module 50 interfaces with the primary data sources and knowledge bases for concurrently analyzing the evidence based on passages having candidate answers, and scores each of candidate answers, in one embodiment, as parallel processing operations. In one embodiment, the architecture may be employed utilizing the Common Analysis System (CAS) candidate answer structures as is described in commonly-owned, issued U.S. Pat. No. 7,139,752, the whole contents and disclosure of which is incorporated by reference as if fully set forth herein.

As depicted in FIG. 1, the Evidence Gathering module 50 comprises a Candidate Answer Scoring module 250 for analyzing a retrieved passage and scoring each of candidate answers of a retrieved passage. The Answer Source Knowledge Base (KB) 21 may comprise one or more databases of structured or semi-structured sources (pre-computed or otherwise) comprising collections of relations (e.g., Typed Lists). In an example implementation, the Answer Source knowledge base may comprise a database stored in a memory storage system, e.g., a hard drive.

An Answer Ranking module 60 may be invoked to provide functionality for ranking candidate answers and determining a response 99 returned to a user via a user's computer display interface (not shown) or a computer system 22, where the response may be an answer, or an elaboration of a prior answer or request for clarification in response to a question—when a high quality answer to the question is not found. A machine learning implementation is further provided where the "answer ranking" module 60 includes a trained model component (not shown) produced using a machine learning techniques from prior data.

The processing depicted in FIG. 1, may be local, on a server, or server cluster, within an enterprise, or alternately, may be distributed with or integral with or otherwise operate in conjunction with a public or privately available search engine in order to enhance the question answer functionality in the manner as described. Thus, the method may be provided as a computer program product comprising instructions executable by a processing device, or as a service deploying the computer program product. The architecture employs a search engine (e.g., a document retrieval system) as a part of Candidate Answer Generation module 30 which may be dedicated to searching the Internet, a publicly available database, a web-site (e.g., IMDB.com) or, a privately available database. Databases can be stored in any storage system, non-volatile memory storage systems, e.g., a hard drive or flash memory, and can be distributed over the network or not.

As mentioned, the system and method of FIG. 1 makes use of the Common Analysis System (CAS), a subsystem of the Unstructured Information Management Architecture (UIMA) that handles data exchanges between the various UIMA components, such as analysis engines and unstructured information management applications. CAS supports data modeling via a type system independent of programming language, provides data access through a powerful indexing mechanism, and provides support for creating annotations on text data, such as described in (http://www.research.ibm.com/journal/sj/433/gotz.html) incorporated by reference as if set forth herein. It should be noted that the CAS allows for multiple definitions of the linkage between a document and its annotations, as is useful for the analysis of images, video, or other non-textual modalities (as taught in the herein incorporated reference U.S. Pat. No. 7,139,752).

In one embodiment, the UIMA may be provided as middleware for the effective management and interchange of unstructured information over a wide array of information sources. The architecture generally includes a search engine, data storage, analysis engines containing pipelined document annotators and various adapters. The UIMA system, method and computer program may be used to generate answers to input queries. The method includes inputting a document and operating at least one text analysis engine that comprises a plurality of coupled annotators for tokenizing document data and for identifying and annotating a particular type of semantic content. Thus it can be used to analyze a question and to extract entities as possible answers to a question from a collection of documents.

As further shown in greater detail in the architecture diagram of FIG. 1, the "Query Analysis" module 20 receives an input that comprises the query 19 entered, for example, by a user via their web-based browser device. An input query 19 may comprise a text string. The query analysis block 20 includes additionally a Lexical Answer Type (LAT) block 200 that implements functions and programming interfaces to provide additional constraints on the answer type (LAT). The computation in the block 20 comprises but is not limited to the Lexical Answer Type. The LAT block 200 includes certain functions/sub-functions (not shown) to determine the LAT.

As mentioned above, a LAT of the question/query is the type (i.e. the descriptor) of the referent of the entity that is a valid answer to the question. In practice, LAT is the descriptor of the answer detected by a natural language understanding module comprising a collection of patterns and/or a parser with a semantic interpreter.

With reference to the Lexical Answer Type (LAT) block 200, in the query analysis module 20 of FIG. 1, the LAT represents the question terms that identify the semantic type of the correct answer. In one embodiment, as known, a LAT may be detected in a question through pattern LAT detection rules. These rules are implemented and can be encoded manually or learned by machine automatically through association rule learning. In this case, the natural language understanding model can be limited to implementation the rules.

In one embodiment, the above-described modules of FIG. 1-2 can be represented as functional components in UIMA is preferably embodied as a combination of hardware and software for developing applications that integrate search and analytics over a combination of structured and unstructured information. The software program that employs UIMA components to implement end-user capability is generally referred to as the application, the application program, or the software application.

The UIMA high-level architecture, one embodiment of which is illustrated in FIG. 1, defines the roles, interfaces and communications of large-grained components that cooperate to implement UIM applications. These include components capable of analyzing unstructured source artifacts, such as documents containing textual data and/or image data, integrating and accessing structured sources and storing, indexing and searching for artifacts based on discovered semantic content.

Although not shown, a non-limiting embodiment of the UIMA high-level architecture includes a Semantic Search Engine, a Document Store, at least one Text Analysis Engine (TAE), at least one Structured Knowledge Source Adapter, a Collection Processing Manager, at least one Collection Analysis Engine, all interfacing with Application logic. In one example embodiment, the UIMA operates to access both structured information and unstructured information to generate candidate answers and an answer in the manner as discussed herein. The unstructured information may be considered to be a collection of documents, and can be in the form of text, graphics, static and dynamic images, audio and various combinations thereof.

Figure 7:
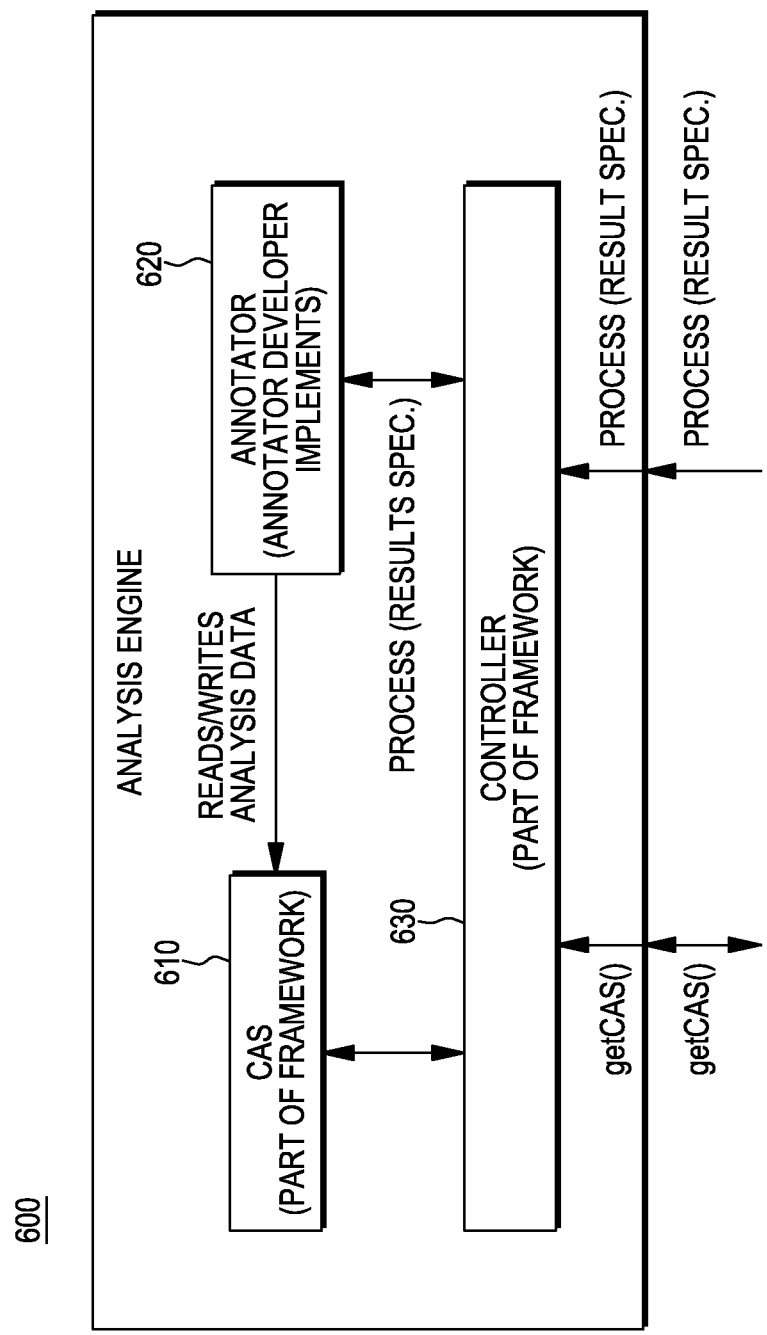
FIG. 7 depicts an aspect of a UIMA framework implementation for providing one type of analysis engine for processing CAS data structures.

Aspects of the UIMA are further shown in FIG. 7, where there is illustrated a Analysis Engine (AE) 600 that can be a component part of the Text Analysis Engine (TAE). Included in the AE 600 is a Common Analysis System (CAS) 610, an annotator 620 and a controller 630. A second embodiment of a TAE (not shown) includes an aggregate Analysis Engine composed of two or more component analysis engines as well as the CAS, and implements the same external interface as the AE 600.

Common Analysis System 610

The Common Analysis System (CAS) 610 is provided as the common facility that all Annotators 620 use for accessing and modifying analysis structures. Thus, the CAS 610 enables coordination between annotators 620 and facilitates annotator 620 reuse within different applications and different types of architectures (e.g. loosely vs. tightly coupled). The CAS 610 can be considered to constrain operation of the various annotators.

The CAS 610 principally provides for data modeling, data creation and data retrieval functions. Data modeling preferably defines a tree hierarchy of (data) types, as shown in the example Table 1 provided below. The types have attributes or properties referred to as features. In preferred embodiments, there are a small number of built-in (predefined) types, such as integer (int), floating point (float) and string; UIMA also includes the predefined data type "Annotation". The data model is defined in the annotator descriptor, and shared with other annotators. In the Table 1, some "Types" that are considered extended from prior art unstructured information management applications to accommodate question answering in the preferred embodiment of the invention include:

TABLE 1

| TYPE (or feature) | TYPE's PARENT (or feature type) |
|---|---|
| Query Record | Top |
| Query | Query Record |
| Query Context | Query Record |
| Candidate Answer Record | Annotation |
| Candidate Answer | Candidate Answer Record |
| Feature: CandidateAnswerScore | Float |
| QueryLexical Answer Type | Annotation |
| CandidateAnswer LT | Annotation |
| Feature: TyCorScore | Float |

In Table 1, for example, all of the question answering types (list in the left column) are new types and extend either another new type or an existing type (shown in the right column). For example, both Query and Query Context are kinds of Query Record, a new type; while Candidate Answer Record extends the UIMA type Annotation, but adds a new feature CandidateAnswerScore which is a Float. In addition, Table 1 describes the query LAT as having a UIMA Annotation type; CandidateAnswerLT is also an Annotation, but with an additional feateu TyCorScore of type Float.

CAS 610 data structures may be referred to as "feature structures." To create a feature structure, the type must be specified (see TABLE 1). Annotations (and—feature structures) are stored in indexes.

The CAS 610 may be considered to be a collection of methods (implemented as a class, for example, in Java or C++) that implements an expressive object-based data structure as an abstract data type. Preferably, the CAS 610 design is largely based on a TAE Feature-Property Structure, that provides user-defined objects, properties and values for flexibility, a static type hierarchy for efficiency, and methods to access the stored data through the use of one or more iterators.

The abstract data model implemented through the CAS 610 provides the UIMA 100 with, among other features: platform independence (i.e., the type system is defined declaratively, independently of a programming language); performance advantages (e.g., when coupling annotators 610 written in different programming languages through a common data model); flow composition by input/output specifications for annotators 610 (that includes declarative specifications that allow type checking and error detection, as well as support for annotators (TAE) as services models); and support for third generation searching procedures through semantic indexing, search and retrieval (i.e. semantic types are declarative, not key-word based).

The CAS 610 provides the annotator 620 with a facility for efficiently building and searching an analysis structure. The analysis structure is a data structure that is mainly composed of meta-data descriptive of sub-sequences of the text of the original document. An exemplary type of meta-data in an analysis structure is the annotation. An annotation is an object, with its own properties, that is used to annotate a sequence of text. There are an arbitrary number of types of annotations. For example, annotations may label sequences of text in terms of their role in the document's structure (e.g., word, sentence, paragraph etc), or to describe them in terms of their grammatical role (e.g., noun, noun phrase, verb, adjective etc.). There is essentially no limit on the number of, or application of, annotations. Other examples include annotating segments of text to identify them as proper names, locations, military targets, times, events, equipment, conditions, temporal conditions, relations, biological relations, family relations or other items of significance or interest.

Typically an Annotator's 620 function is to analyze text, as well as an existing analysis structure, to discover new instances of the set of annotations that it is designed to recognize, and then to add these annotations to the analysis structure for input to further processing by other annotators 620.

In addition to the annotations, the CAS 610 of FIG. 7 may store the original document text, as well as related documents that may be produced by the annotators 620 (e.g., translations and/or summaries of the original document). Preferably, the CAS 610 includes extensions that facilitate the export of different aspects of the analysis structure (for example, a set of annotations) in an established format, such as XML.

More particularly, the CAS 610 is that portion of the TAE that defines and stores annotations of text. The CAS API is used both by the application and the annotators 620 to create and access annotations. The CAS API includes, preferably, at least three distinct interfaces. A Type system controls creation of new types and provides information about the relationship between types (inheritance) and types and features. One non-limiting example of type definitions is provided in TABLE 1. A Structure Access Interface handles the creation of new structures and the accessing and setting of values. A Structure Query Interface deals with the retrieval of existing structures.

The Type system provides a classification of entities known to the system, similar to a class hierarchy in object-oriented programming. Types correspond to classes, and features correspond to member variables. Preferably, the Type system interface provides the following functionality: add a new type by providing a name for the new type and specifying the place in the hierarchy where it should be attached; add a new feature by providing a name for the new feature and giving the type that the feature should be attached to, as well as the value type; and query existing types and features, and the relations among them, such as "which type(s) inherit from this type".

Preferably, the Type system provides a small number of built-in types. As was mentioned above, the basic types are int, float and string. In a Java implementation, these correspond to the Java int, float and string types, respectively. Arrays of annotations and basic data types are also supported. The built-in types have special API support in the Structure Access Interface.

The Structure Access Interface permits the creation of new structures, as well as accessing and setting the values of existing structures. Preferably, this provides for creating a new structure of a given type; getting and setting the value of a feature on a given structure; and accessing methods for built-in types. Feature definitions are provided for domains, each feature having a range.

In an alternative environment, modules of FIGS. 1, 2 can be represented as functional components in GATE (General Architecture for Text Engineering) (see: http://gate.ac.uk/releases/gate-2.0alpha2-build484/doc/userguide.html). Gate employs components which are reusable software chunks with well-defined interfaces that are conceptually separate from GATE itself. All component sets are user-extensible and together are called CREOLE—a Collection of REusable Objects for Language Engineering. The GATE framework is a backplane into which plug CREOLE components. The user gives the system a list of URLs to search when it starts up, and components at those locations are loaded by the system. In one embodiment, only their configuration data is loaded to begin with; the actual classes are loaded when the user requests the instantiation of a resource.). GATE components are one of three types of specialized Java Beans: 1) Resource: The top-level interface, which describes all components. What all components share in common is that they can be loaded at runtime, and that the set of components is extendable by clients. They have Features, which are represented externally to the system as "meta-data" in a format such as RDF, plain XML, or Java properties. Resources may all be Java beans in one embodiment. 2) ProcessingResource: Is a resource that is runnable, may be invoked remotely (via RMI), and lives in class files. In order to load a PR (Processing Resource) the system knows where to find the class or jar files (which will also include the metadata); 3) LanguageResource: Is a resource that consists of data, accessed via a Java abstraction layer. They live in relational databases; and, VisualResource: Is a visual Java bean, component of GUIs, including of the main GATE gui. Like PRs these components live in .class or .jar files.

In describing the GATE processing model any resource whose primary characteristics are algorithmic, such as parsers, generators and so on, is modelled as a Processing Resource. A PR is a Resource that implements the Java Runnable interface. The GATE Visualisation Model implements resources whose task is to display and edit other resources are modelled as Visual Resources. The Corpus Model in GATE is a Java Set whose members are documents. Both Corpora and Documents are types of Language Resources (LR) with all LRs having a Feature Map (a Java Map) associated with them that stored attribute/value information about the resource. FeatureMaps are also used to associate arbitrary information with ranges of documents (e.g. pieces of text) via an annotation model. Documents have a DocumentContent which is a text at present (future versions may add support for audiovisual content) and one or more AnnotationSets which are Java Sets.

As UIMA, GATE can be used as a basis for implementing natural language dialog systems and multimodal dialog systems having the disclosed question answering system as one of the main submodules. The references, incorporated herein by reference above (U.S. Pat. Nos. 6,829,603 and 6,983,252, and 7,136,909) enable one skilled in the art to build such an implementation.

FIG. 8 illustrates an exemplary hardware configuration of a computing system 401 in which the present system and method may be employed. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 401 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A computer program product for automatically generating answers to questions, the computer program product comprising a non-transitory storage medium, said medium not a propagating signal, said non-transitory storage medium readable by a processing circuit and storing instructions run by the processing circuit for performing a method, the method comprising:
receiving an input query;
determining a lexical answer type (LAT) for the input query;
receiving a candidate answer for the input query;
matching the candidate answer to a first instance in an ontology;
matching the first instance to a first instance type in the ontology;

matching the LAT to a second instance type in the ontology;
identifying one or more logical rules in the ontology that relate the second instance type to the first instance type;
producing a score for the candidate answer based on the matching steps; and
modifying the score for the candidate answer based on the logical rule identified that relates the second instance type and the first instance type.

2. The computer program product of claim 1, wherein said identifying one or more logical rules comprises:
identifying an axiom in said ontology indicating a disjoint relation between the first instance type and the second instance type.

3. The computer program product of claim 1, wherein said identifying one or more logical rules comprises:
identifying an axiom in said ontology indicating one of:
an equivalence relation between the first instance type and the second instance type,
a subsumption relation between the first instance type and the second instance type, and
a sibling relation between the first instance type and the second instance type.

4. The computer program product of claim 1, wherein said lexical answer type is a word concept, said ontology providing one or more senses associated with a word concept.

5. The computer program product of claim 4, wherein said matching the lexical answer type to the second instance type in the ontology comprises:
accessing a resource having ontological content;
obtaining, from said resource, a ranking of senses of the obtained type or concept instance.

6. The computer program product of claim 1, wherein said lexical answer type comprises a query LAT string, said matching the lexical answer type to the second instance in the ontology comprises:
accessing a resource having ontological content;
obtaining one or more types from said resource that match the query LAT string; and
accessing a data corpus, and obtaining from said data corpus a ranked list of second instances based on said obtained one or more types therein.

7. The computer program product of claim 6, wherein said matching the lexical answer type to a second instance type in the ontology further comprises:
accessing said resource having ontological content;
identifying a context in said input query; and
computing a similarity measure between the identified context of said input query and contextual data associated with the obtained types from the ontological content.

8. The computer program product of claim 7, wherein said computing a similarity measure comprises:
obtaining a representation of said context; and
implementing a function to compute said similarity between the identified context and contextual data based on the representation.

9. The computer program product of claim 8, wherein said implementing a function comprises:
aligning the context using a BOW (bag of words) approach; or,
applying a vector model to compute said similarity.

10. The computer program product of claim 8, further comprising:
computing a confidence score based on a weighted or un-weighted combination of one or more of: said sense rank, said ranked list of said second instances, and said computed similarity measure.

11. The computer program product of claim 4, wherein said candidate answer comprises a candidate answer string, said matching the candidate answer to a first instance in the ontology comprises:
accessing a resource having ontological content;
obtaining one or more types from said resource that match said candidate answer string; and
accessing a data corpus, and obtaining from said data corpus a ranked list of first instances based on a frequency of occurrence of said one or more types therein.

12. The computer program product of claim 11, wherein said matching the candidate answer to a first instance in the ontology further comprises:
accessing said resource having ontological content;
identifying a context in said input query;
computing a similarity measure between the identified context of said input query and contextual data associated with the obtained types from the ontological content.

13. The computer program product of claim 12, further comprising:
computing a confidence score based on a weighted or un-weighted combination of said ranked list of first instances and said computed similarity measure.

14. A system for generating answers to questions comprising:
a memory;
a hardware processor in communication with the memory configured for:
receiving an input query;
determining a lexical answer type (LAT) for the input query;
receiving a candidate answer for the input query;
matching the candidate answer to a first instance in an ontology;
matching the first instance to a first instance type in the ontology;
matching the LAT to a second instance type in the ontology;
identifying one or more logical rules in the ontology that relate the second instance type to the first instance type;
producing a score for the candidate answer based on the matching steps; and
modifying the score for the candidate answer based on the logical rule identified that relates the second instance type and the first instance type.

15. The system of claim 14, wherein said identifying one or more logical rules comprises:
identifying an axiom in said ontology indicating a disjoint relation between the first instance type and the second instance type.

16. The system of claim 14, wherein said identifying one or more logical rules comprises:
identifying an axiom in said ontology indicating one of:
an equivalence relation between the first instance type and the second instance type,
a subsumption relation between the first instance type and the second instance type, and
a sibling relation between the first instance type and the second instance type.

17. The system of claim 14, wherein said lexical answer type is a word concept, said ontology providing one or more senses associated with a word concept.

18. The system of claim 17, wherein said matching the lexical answer type to the second instance type in the ontology comprises:
    accessing a resource having ontological content;
    obtaining, from said resource, a ranking of senses of the obtained type or concept instance.

19. The system of claim 18, wherein said lexical answer type comprises a query LAT string, said matching the lexical answer type to the second instance in the ontology comprises:
    accessing a resource having ontological content;
    obtaining one or more types from said resource that match the query LAT string; and
    accessing a data corpus, and obtaining from said data corpus a ranked list of second instances based on said obtained one or more types therein.

20. The system of claim 19, wherein said matching the lexical answer type to a second instance type in the ontology further comprises:
    accessing said resource having ontological content;
    identifying a context in said input query; and
    computing a similarity measure between the identified context of said input query and contextual data associated with the obtained types from the ontological content.

21. The system of claim 20, wherein said computing a similarity measure comprises:
    obtaining a representation of said context; and
    implementing a function to compute said similarity between the identified context and contextual data based on the representation.

22. The system of claim 21, wherein said implementing a function comprises:
    aligning the context using a BOW (bag of words) approach; or,
    applying a vector model to compute said similarity.

23. The system of claim 21, further comprising:
    computing a confidence score based on a weighted or un-weighted combination of one or more of: said sense rank, said ranked list of said second instances, and said computed similarity measure.

24. The system of claim 17, wherein said candidate answer comprises a candidate answer string, said matching the candidate answer to a first instance in the ontology comprises:
    accessing a resource having ontological content;
    obtaining one or more types from said resource that match said candidate answer string; and
    accessing a data corpus, and obtaining from said data corpus a ranked list of first instances based on a frequency of occurrence of said one or more types therein.

25. The system of claim 24, wherein said matching the candidate answer to a first instance in the ontology further comprises:
    accessing said resource having ontological content;
    identifying a context in said input query;
    computing a similarity measure between the identified context of said input query and contextual data associated with the obtained types from the ontological content.

26. The system of claim 25, wherein the hardware processor is further configured for:
    computing a confidence score based on a weighted or un-weighted combination of said ranked list of first instances and said computed similarity measure.

* * * * *